(12) United States Patent
Jiang et al.

(10) Patent No.: US 12,006,955 B2
(45) Date of Patent: Jun. 11, 2024

(54) ANTI-LOOSENING DEVICE AND PLUNGER PUMP

(71) Applicant: YANTAI JEREH PETROLEUM EQUIPMENT & TECHNOLOGIES CO., LTD., Shandong (CN)

(72) Inventors: Chen Jiang, Shandong (CN); Xiaosong Wei, Shandong (CN); Xiaobin Li, Shandong (CN); Haiping Cui, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 541 days.

(21) Appl. No.: 17/217,507

(22) Filed: Mar. 30, 2021

(65) Prior Publication Data

US 2022/0235802 A1    Jul. 28, 2022

(30) Foreign Application Priority Data

Jan. 27, 2021   (CN) .......................... 202120223437.7

(51) Int. Cl.
*F15B 15/26*   (2006.01)
*F16D 1/093*   (2006.01)
(Continued)

(52) U.S. Cl.
CPC ............ *F15B 15/262* (2013.01); *F04B 53/14* (2013.01); *F04B 53/22* (2013.01)

(58) Field of Classification Search
CPC ......... F04B 53/14; F04B 53/22; F15B 15/262
See application file for complete search history.

(56) References Cited

U.S. PATENT DOCUMENTS

| 8,925,747 B1* | 1/2015 | Hanley | .................. A47H 1/022 |
| | | | 211/105.6 |
| 2011/0296982 A1* | 12/2011 | Dille | ..................... F16B 39/103 |
| | | | 29/525.01 |

(Continued)

FOREIGN PATENT DOCUMENTS

| CN | 207554027 U | 6/2018 |
| CN | 208934526 U | * 6/2019 |

(Continued)

OTHER PUBLICATIONS

English translation of CN-208934526-U obtained Nov. 30, 2023 (Year: 2019).*

*Primary Examiner* — Connor J Tremarche
(74) *Attorney, Agent, or Firm* — XSENSUS LLP

(57) ABSTRACT

Embodiments of the present disclosure provides an anti-loosening device and a plunger pump. The anti-loosening device includes a first bracket, a second bracket and an elastic member. The first bracket includes a first clamping part defining a first accommodating space; a first connecting part extending in a first direction and fixedly connected to the first clamping part; and a limiting part fixedly connected to the first clamping part via the first connecting part, wherein the limiting part protrudes from the first connecting part in a second direction perpendicular to the first direction. The second bracket includes a second clamping part defining a second accommodation space, wherein the second clamping part is opposite to the first clamping part in the first direction; and a second connecting part extending in the first direction and fixedly connected to the second clamping part.

18 Claims, 3 Drawing Sheets

(51) Int. Cl.
*F04B 53/14* (2006.01)
*F04B 53/22* (2006.01)

(56) References Cited

U.S. PATENT DOCUMENTS

2014/0271290 A1 9/2014 Davis et al.
2017/0175799 A1 6/2017 Arnold

FOREIGN PATENT DOCUMENTS

| CN | 208934526 U | 6/2019 |
| CN | 111503342 A | 8/2020 |

* cited by examiner

ANTI-LOOSENING DEVICE AND PLUNGER PUMP

CROSS-REFERENCE TO RELATED APPLICATION

For all purposes under the U.S. law, the present application claims priority of the Chinese Utility Model Application No. 202120223437.7, filed on Jan. 27, 2021, the disclosure of which is incorporated herein by reference in its entirety as part of the present application.

TECHNICAL FIELD

Embodiments of the present disclosure relate to an anti-loosening device and a plunger pump.

BACKGROUND

Hydraulic fracturing construction has gradually become the main stimulation treatment in the oilfield. Under an action of high pressure, fracturing fluid or sand-carrying fluid is pumped to a bottom of a well to realize a fracturing operation, thus increasing oil and gas production. The key component for such construction method is a plunger pump that produces high-pressure fluid. The plunger pump is mainly constituted by a power end and a hydraulic end. In the operation process, a crank-connecting rod mechanism in the power end drives a plunger in the hydraulic end to reciprocate, and a packing nut can lock a packing seal assembly in the hydraulic end to seal the high-pressure fluid at the plunger.

SUMMARY

An embodiment of the present disclosure provides an anti-loosening device, including: a first bracket, a second bracket and an elastic member. The first bracket includes a first clamping part defining a first accommodating space; a first connecting part extending in a first direction and fixedly connected to the first clamping part; and a limiting part fixedly connected to the first clamping part via the first connecting part, wherein the limiting part protrudes from the first connecting part in a second direction perpendicular to the first direction. The second bracket includes a second clamping part defining a second accommodation space, wherein the second clamping part is opposite to the first clamping part in the first direction; and a second connecting part extending in the first direction and fixedly connected to the second clamping part. The elastic member connects the first bracket and the second bracket, and is configured to control a relative movement of the first bracket and the second bracket in the first direction.

In an example, one of the first connecting part and the second connecting part is inserted into the other of the first connecting part and the second connecting part, and the first connecting part is partially overlapped with the second connecting part in the second direction.

In an example, the first connecting part has a tubular shape, the second connecting part has a pillar shape, and the second connecting part is inserted into the first connecting part.

In an example, the limiting part has a pillar shape.

In an example, the elastic member is located inside the first connecting part, and the elastic member is abutted against the first clamping part and the second connecting part.

In an example, the elastic member is a spring.

In an example, the first connecting part is provided with an opening, the anti-loosening device further includes a protruding member which passes through the opening and is detachably connected to the second connecting part, the protruding member protrudes from an outer surface of the first connecting part along a third direction, and the third direction intersects with the first direction and the second direction.

In an example, the opening has a strip shape extending in the first direction, and a maximum distance by which the protruding member is capable of moving in the opening along the first direction is greater than a maximum size of the second clamping part in the first direction.

In an example, the first clamping part is consisted of a first plate-shaped member and a second plate-shaped member, the first plate-shaped member is overlapped with the first connecting part in the first direction, and the second plate-shaped member is located at an end of the first plate-shaped member away from the limiting part in the second direction.

In an example, the second clamping part includes a third plate-shaped member, a fourth plate-shaped member and a fifth plate-shaped member which are connected to the third plate-shaped member; in the first direction, the third plate-shaped member is overlapped with the second connecting part; and in the second direction, the fourth plate-shaped member is located at an end of the third plate-shaped member close to the limiting part, and the fifth plate-shaped member is located at an end of the third plate-shaped member away from the limiting part.

In an example, a material of the first bracket and a material of the second bracket are rigid material.

Another embodiment of the present disclosure provides a plunger pump, including: a hydraulic end, a fastener rotatable in a locking direction to be installed on a side of the hydraulic end, and a first stay rod and a second stay rod which are fixedly connected to the side of the hydraulic end, wherein the fastener includes a plurality of positioning holes, the plunger pump further includes any one of the anti-loosening devices described above, the first clamping part of the anti-loosening device is abutted against the first stay rod so that at least a part of the first stay rod is located in the first accommodating space, the second clamping part of the anti-loosening device is abutted against the second stay rod so that at least a part of the second stay rod is located in the second accommodating space, an end of the limiting part opposite to the first connecting part is inserted into any one of the plurality of positioning holes of the fastener along the second direction, and the elastic member is in an elastic deformation state.

In an example, the first stay rod is located upstream of the second stay rod in the locking direction.

In an example, in the first direction, the limiting part of the anti-loosening device is located between the first stay rod and the second stay rod.

In an example, the plunger pump further includes a plunger movably connected to the hydraulic end, the fastener is a packing nut arranged coaxially with the plunger.

BRIEF DESCRIPTION OF THE DRAWINGS

In order to clearly illustrate the technical solutions of the embodiments of the present disclosure or a prior art, the drawings necessarily for explaining the embodiments or the prior art will be briefly described in the following; it is

DETAILED DESCRIPTION

Figure 1:
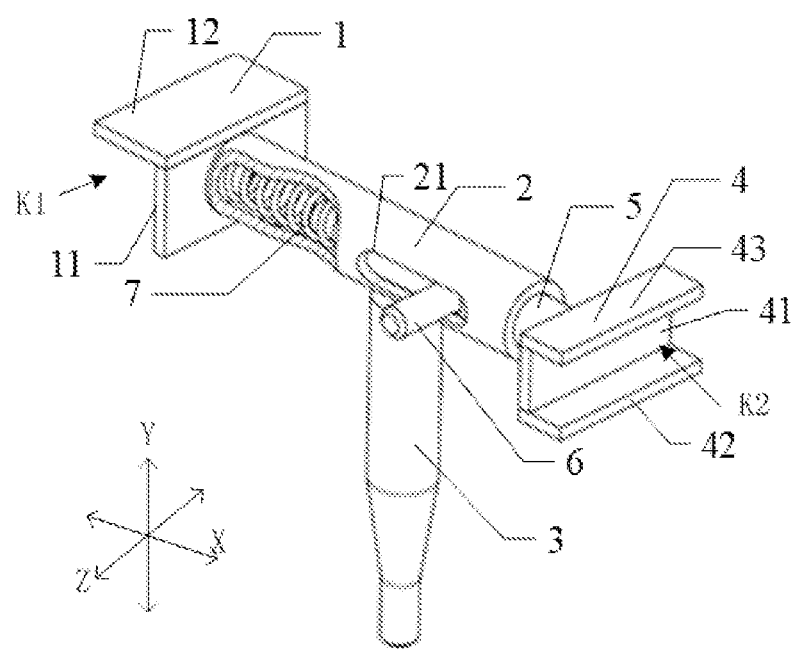
FIG. 1 illustrates a three-dimensional schematic diagram of an anti-loosening device according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical or scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a plunger pump, due to the continuous reciprocating motion of plungers, fasteners such as the packing nut may be loosen and disengaged due to vibration and other factors, which may cause the fasteners such as the packing nut to collide with other components (for example, a plunger clamp) and damage the equipment. An on-site personnel needs to inspect and fasten the fasteners such as the packing nut regularly (for example, every 2 to 3 hours), thus affecting the efficiency and safety of the on-site operation.

The embodiments of the present disclosure provides an anti-loosening device and a plunger pump, which can effectively solve the problem that the packing nut may be loose, reduce the number of times of inspection performed by the on-site personnel, improve the operation efficiency and ensure the operation security of the equipment.

The anti-loosening device provided by the embodiment of the present disclosure includes a first bracket, a second bracket and an elastic member. The first bracket includes a first clamping part defining a first accommodating space; a first connecting part extending in a first direction and fixedly connected to the first clamping part; and a limiting part fixedly connected to the first clamping part via the first connecting part, wherein the limiting part protrudes from the first connecting part in a second direction perpendicular to the first direction. The second bracket includes a second clamping part defining a second accommodation space, wherein the second clamping part is opposite to the first clamping part in the first direction; and a second connecting part extending in the first direction and fixedly connected to the second clamping part. The elastic member connects the first bracket and the second bracket, and is configured to control a relative movement of the first bracket and the second bracket in the first direction.

In this way, a fastener can be effectively prevented from rotating in a loosening direction by abutting the first clamping part and the second clamping part against two adjacent stay rods of the plunger pump, respectively, and by inserting an end of the limiting part opposite to the first connecting part into a positioning hole of the fastener. In addition, a relative movement of the first bracket and the second bracket may be achieved by utilizing a stretching-out and drawing-back of the elastic member, so that the anti-loosening device can be installed on or removed from the stay rods and the fastener without relying on other tools, thereby increasing the convenience of disassembly and assembly of the anti-loosening device.

Figure 2:
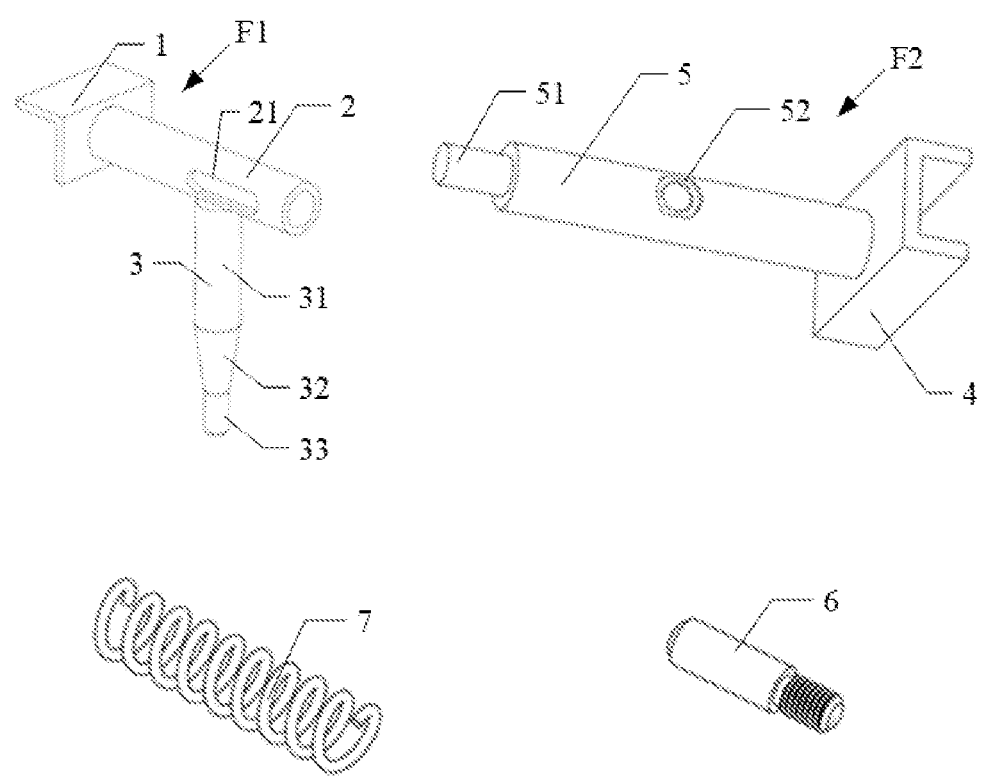
FIG. 2 illustrates a three-dimensional schematic diagram of respective parts of the anti-loosening device in a disassembled state according to the embodiment of the present disclosure.

FIG. 1 illustrates a three-dimensional schematic diagram of an anti-loosening device according to an embodiment of the present disclosure; FIG. 2 illustrates a three-dimensional schematic diagram of respective parts of an anti-loosening device in a disassembled state according to an embodiment of the present disclosure.

Referring to FIGS. 1 and 2, the anti-loosening device S as provided by the embodiment of the present disclosure includes a first bracket F1 and a second bracket F2. For example, a material of the first bracket F1 and the second bracket F2 is a rigid material, such as metal, and more specifically, steel. When installed on stay rods and fastener of a plunger pump, the first bracket F1 and the second bracket F2 can bear the stress caused by various vibrations during the operation of the plunger pump without generating any substantial deformation.

The first bracket F1 includes a first clamping part 1, a first connecting part 2 and a limiting part 3 which are fixedly connected.

The first clamping part 1 defines a first accommodation space K1. The first clamping part 1 is configured to be clamped on a first stay rod of a plunger pump, so that at least a part of the first stay rod is located in the first accommodation space K1.

The first connecting part 1 extends in the first direction X. The limiting part 3 is fixedly connected to the first clamping part 1 via the first connecting part 1. For example, the first clamping part 1, the first connecting part 2 and the limiting part 3 are fixedly connected as a whole by welding. However, the embodiment of the present disclosure is not intended to limit the fixed connection mode of the first clamping part 1, the first connecting part 2 and the limiting part 3.

The limiting part 3 protrudes from the first connecting part 2 in a second direction Y perpendicular to the first direction X. An end of the limiting part 3 away from the first connecting part 2 in the second direction Y is configured to be inserted into a positioning hole of a fastener.

The second bracket F2 includes a second clamping part 4 and a second connecting part 5 which are fixedly connected.

The second clamping part 4 defines a second accommodation space K2; The second clamping part 4 is configured to be clamped on a second stay rod of the plunger pump, so that at least a part of a second stay rod is located in the second accommodation space K2.

The second clamping part 4 is opposite to the first clamping part 1 in the first direction X.

The second connecting part 5 extends in the first direction X. The second connecting part 5 is movably connected to the first connecting part 2 in the first direction X.

In the case of the end of the limiting part 3 far away from the first connecting part 2 in the second direction Y being inserted into the positioning hole of the fastener and the first clamping part 1 and the second clamping part 4 being respectively clamped on the first stay rod and the second stay rod, loosening (if any) of the fastener would drive the first bracket F1 to rotate towards a first side where the first stay rod is located; and the first stay rod restricts the first bracket F1 from further rotating towards the first stay rod because the first bracket F1, as a rigid support, has already been abutted against the first stay rod. Therefore, the first stay rod provides the fastener with a resistance force towards a second side where the second stay rod is located, via the first bracket F1, so as to restrict the fastener from rotating in the loosening direction. In addition, the first clamping part 1 and the second clamping part 4 are respectively detachably clamped onto the first stay rod and the second stay rod which are located the outside of the plunger pump, thus enhancing the installation stability of the anti-loosening device S on the one hand and improving the installation convenience of the anti-loosening device on the other hand.

In this embodiment, the second connecting part 5 is inserted into the first connecting part 2, and the first connecting part 2 is partially overlapped with the second connecting part 5 in the second direction Y. In this way, the first connecting part 2 and the second connecting part 5 are nested with each other so as to have a stable, relative movement in the first direction.

For example, the first connecting part 2 has a tubular shape; the second connecting part 5 has a pillar shape; the second connecting part 5 is inserted into the first connecting part 2. For example, an axial direction of the first connecting part 2 is the first direction X; an axial direction of the second connecting part 5 is the first direction X. The first connecting part 2 is arranged coaxially with the second connecting part 5.

More specifically, the first connecting part 2 has a circular tube shape; the second connecting part 5 has a cylindrical shape. However, the embodiment of the present disclosure does not limit the specific shapes of the first connecting part 2 and the second connecting part 5.

The limiting part 3 has, for example, a pillar shape. An axial direction of the limiting part 3 is, for example, the Y direction. For example, the limiting part 3 includes a first cylindrical portion 31, a truncated cone portion 32, and a second cylindrical portion 33 that are sequentially arranged in a direction away from the first connecting part 2. The first cylindrical portion 31, the truncated cone portion 32 and the second cylindrical portion 33 are coaxially arranged. A diameter of the first cylindrical portion 31 is greater than that of the second cylindrical portion 33. In this way, on the one hand, it can ensure that the limiting part 3 has great deformation resistance, and on the other hand, it can facilitate inserting the second cylindrical portion 33 into the positioning hole of the fastener.

The anti-loosening device S further includes an elastic member 7 located inside the first connecting part 2. The elastic member 7 is abutted against the first clamping part 1 and the second connecting part 5.

For example, the elastic member 7 is a spring. An end of the second connecting part 5 close to the spring is provided with a convex part 51. When the spring 7 is abutted against the second connecting part 5, the convex part 51 is inserted into the spring 7.

In the above embodiment, the second connecting part 5 is inserted into the first connecting part 2, but the embodiment of the present disclosure is not limited to such nesting relationship between the first connecting part and the second connecting part. In another embodiment, the first connecting part that is fixedly connected with both of the limiting part and the first clamping part is inserted into the second connecting part which is fixedly connected with the second clamping part.

In the above embodiment, the elastic member 7 is located inside the first connecting part 2. However, the embodiment of the present disclosure is not limited thereto, as long as the elastic member 7 can control the relative movement of the first bracket F1 and the second bracket F2 in the first direction by being abutted against the first bracket F1 and the second bracket F2.

The first connecting part 2 is provided with an opening 21.

The anti-loosening device S further includes a protruding member 6. The protruding member 6 is detachably connected to the second connecting part 5 through the opening 21.

In this embodiment, the second connecting part 5 is provided with an internal threaded hole, and an end of the protruding member 6 close to the second connecting part 5 is provided with an external threaded structure matched with the internal threaded hole. The protruding member 6 is detachably connected to the second connecting part 5 through the internal threaded hole and the external threaded structure. The protruding member 6 protrudes from an outer surface of the first connecting part 2. Here, the specific manner in which the protruding member 6 is detachably connected to the second connecting part 5 is not limited.

For example, the protruding member 6 protrudes from the first connecting part in a third direction that intersects with both of the first direction X and the second direction Y. For example, the third direction is a direction Z perpendicular to both of the first direction X and the second direction Y. For example, the protruding member 6 has a pillar shape, for example. An axial direction of the protruding member 6 is the third direction Z.

For example, the opening 21 has a strip shape extending in the first direction X. A maximum distance by which the protruding member 6 is capable of moving in the opening 21 along the first direction X is greater than a maximum size of the second clamping part in the first direction. In this way, the installation of the anti-loosening device can be facilitated.

For example, the first clamping part 1 is consisted of a first plate-shaped member 11 and a second plate-shaped member 12. The first plate-shaped member 11 is overlapped with the first connecting part 2 in the first direction X; and the second plate-shaped member 12 is located at an end of the first plate-shaped member 11 away from the limiting part 3 in the second direction Y. This configuration can reduce the compression degree of the elastic member when installing the anti-loosening device.

For example, in a plane where the first direction X and the second direction Y are located, the first clamping part 1 has an L-shaped cross section.

For example, the second clamping part 4 includes a third plate-shaped member 41, a fourth plate-shaped member 42 and a fifth plate-shaped member 43. The fourth plate-shaped member 42 and the fifth plate-shaped member 43 are both connected to the third plate-shaped member 41.

In the first direction X, the third plate-shaped member 41 is overlapped with the second connecting part 5; in the second direction Y, the fourth plate-shaped member 42 is located at an end of the third plate-shaped member 41 close to the limiting part 3. In the second direction Y, the fifth plate-shaped member 43 is located at an end of the third plate-shaped member 41 away from the limiting part 3.

For example, each of the first plate-shaped member 11, the second plate-shaped member 12, the third plate-shaped member 41, the fourth plate-shaped member 42, and the fifth plate-shaped member 43 has a flat plate shape. However, in another embodiment, any one of the first plate-shaped member 11, the second plate-shaped member 12, the third plate-shaped member 41, the fourth plate-shaped member 42, and the fifth plate-shaped member 43 may have other shapes, such as an arc plate shape.

For example, the first plate-shaped member 11 is perpendicular to the first direction X, and the second plate-shaped member 12 is perpendicular to the second direction Y.

For example, the third plate-shaped member 41 is perpendicular to the first direction X, and both the fourth plate-shaped member 42 and the fifth plate-shaped member 43 are perpendicular to the second direction Y.

When assembling the anti-loosening device S, firstly, the spring 7 is placed into the first connecting part 2 of the first bracket F1, then the second connecting part 5 of the second bracket F2 is placed into the first connecting part 2 of the first bracket F1, and finally the protruding member 6 is screwed into the threaded hole 52 of the second bracket F2. Assembling the anti-loosening device S onto the plunger pump or disassembling the anti-loosening device S from the plunger pump can be controlled by pushing the protruding member 6.

Figure 3:
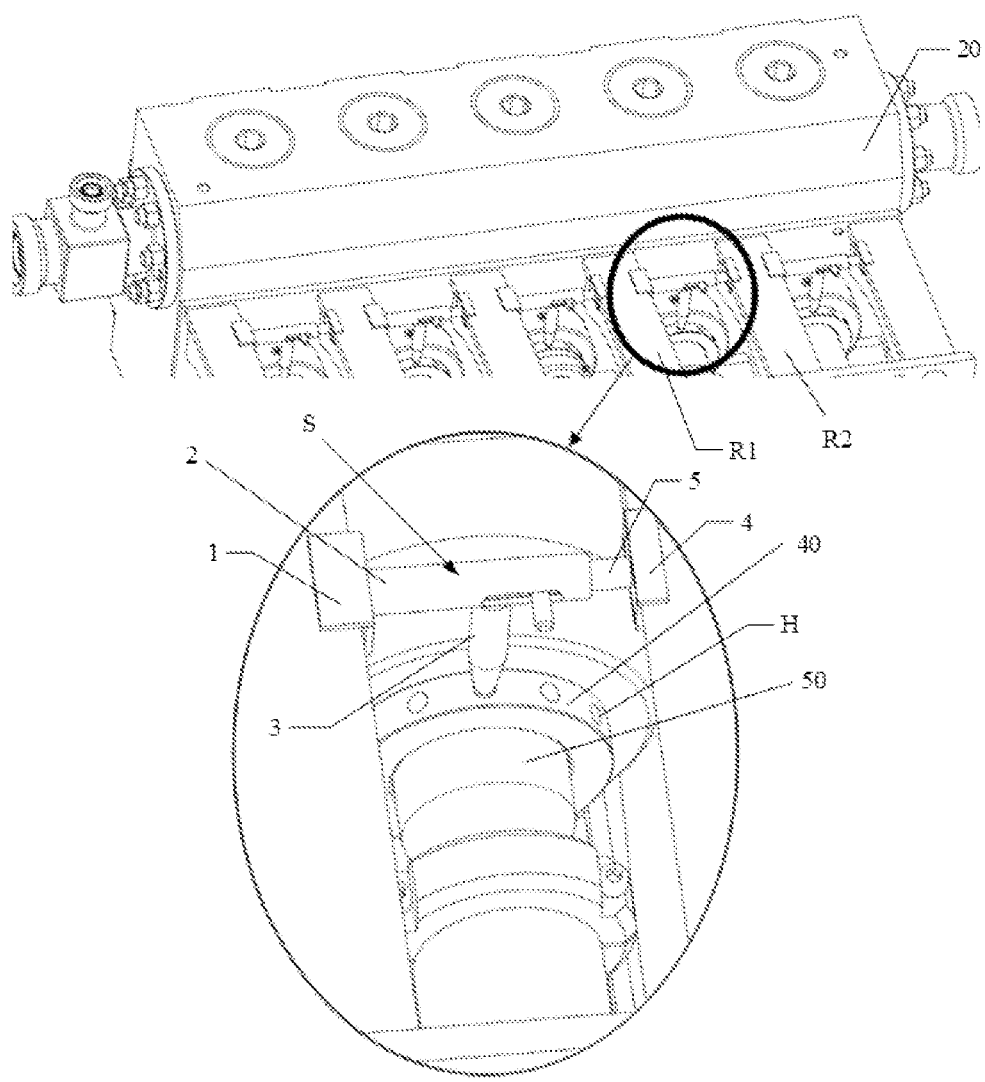
FIG. 3 illustrates a partial three-dimensional schematic diagram of a plunger pump according to an embodiment of the present disclosure, in which a part including an anti-loosening device is enlarged.

FIG. 3 illustrates a partial three-dimensional schematic diagram of a plunger pump according to an embodiment of the present disclosure, in which a part including an anti-loosening device is enlarged.

Referring to FIG. 3, a plunger pump provided by another embodiment of the present disclosure includes a hydraulic end 20, a fastener 40 rotatable in a locking direction to be installed on a side of the hydraulic end 20, a first stay rod R1 and a second stay rod R2 both fixedly connected to the side of the hydraulic end 20, and the anti-loosening device S. For example, the locking direction is a clockwise direction, and the loosening direction is a counterclockwise direction.

The fastener 40 includes a plurality of positioning holes H.

The first clamping part 1 of the anti-loosening device S is abutted against the first stay rod R1 so that at least a part of the first stay rod R1 is located in the first accommodation space; the second clamping part 4 of the anti-loosening device S is abutted against the second stay rod R2 so that at least a part of the second stay rod R2 is located in the second accommodating space, and an end of the limiting part 3 opposite to the first connecting part 2 is inserted into any one of the positioning holes H of the fastener 40 along the second direction Y. The elastic member 7 is in an elastic deformation state.

The elastic member in the elastic deformation state provides the first bracket and the second bracket with an acting force which causes the first bracket and the second bracket to be away from each other in the first direction, so that the first bracket and the second bracket are firmly abutted against the first stay rod and the second stay rod, respectively.

The first stay rod R1 is located upstream of the second stay rod R2 in the locking direction. That is, in a plane perpendicular to an axial direction of the fastener 40, a straight connecting line connecting a center of the fastener 40 and the first stay rod R1 is a first straight connecting line; and a straight connecting line connecting the center of the fastener 40 and the second stay rod R2 is a second straight connecting line. Upon rotating the first straight connecting line around the axial direction of the fastener 40 by an acute angle in the locking direction, the first straight connecting line can coincide with the second straight connecting line.

For example, in the first direction X, the limiting part 3 of the anti-loosening device S is located between the first stay rod R1 and the second stay rod R2.

For example, the first stay rod R1 is parallel to the second stay rod R2.

The plunger pump further includes a plunger 50 movably connected to the hydraulic end. The fastener 40 is a packing nut which is arranged coaxially with the plunger 50.

Each of the plurality of positioning holes H of the fastener 40 extends, for example, in a radial direction of the fastener 40.

Herein, some points needs to be explained:

(1) Drawings of the embodiments of the present disclosure only refer to structures related with the embodiments of the present disclosure, and other structures may refer to general design.

(2) For clarity, in the drawings used to describe embodiments of the present disclosure, the thickness of layers or regions is enlarged or reduced, i.e., these drawings are not drawn to actual scale.

(3) In case of no conflict, features in the embodiments and the embodiments of the present disclosure may be combined with each other to obtain new embodiment(s).

The foregoing embodiments merely are exemplary embodiments of the present disclosure, and not intended to limit the scope of the present disclosure, and the scope of the present disclosure is determined by the appended claims.

What is claimed is:
1. An anti-loosening device, comprising:
   a first bracket, comprising:
      a first clamping part defining a first accommodating space;
      a first connecting part extending in a first direction and fixedly connected to the first clamping part; and
      a limiting part fixedly connected to the first clamping part via the first connecting part, wherein the limiting part protrudes from the first connecting part in a second direction perpendicular to the first direction; and
   a second bracket, comprising:
      a second clamping part defining a second accommodation space, wherein the second clamping part is opposite to the first clamping part in the first direction, and
      a second connecting part extending in the first direction and fixedly connected to the second clamping part, and
   an elastic structure connecting the first bracket and the second bracket and configured to control a relative movement of the first bracket and the second bracket in the first direction, wherein the first clamping part is consisted of a first plate-shaped structure and a second plate-shaped structure, the first plate-shaved structure is overlapped with the first connecting part in the first direction, and the second plate-shaped structure is located at an end of the first plate-shaped structure away from the limiting part in the second direction, the second clamping part comprises a third plate-shaped structure, a fourth plate-shaped structure and a fifth plate-shaped structure which are connected to the third plate-shaped structure, in the first direction, the third plate-shaped structure is overlapped with the second connecting part, and in the second direction, the fourth plate-shaped structure is located at an end of the third plate-shaped structure close to the limiting part, and the fifth plate-shaped structure is located at an end of the third plate-shaped structure away from the limiting part.

2. The anti-loosening device according to claim 1, wherein one of the first connecting part and the second connecting part is inserted into the other of the first connecting part and the second connecting part, and the first connecting part is partially overlapped with the second connecting part in the second direction.

3. The anti-loosening device according to claim 2, wherein the first connecting part has a tubular shape, the second connecting part has a pillar shape, and the second connecting part is inserted into the first connecting part.

4. The anti-loosening device according to claim 3, wherein the elastic structure is located inside the first connecting part, and the elastic structure is abutted against the first clamping part and the second connecting part.

5. The anti-loosening device according to claim 4, wherein the elastic structure is a spring.

6. The anti-loosening device according to claim 4, wherein the first connecting part is provided with an opening, the anti-loosening device further comprises a protruding structure which passes through the opening and is detachably connected to the second connecting part, the protruding structure protrudes from an outer surface of the first connecting part along a third direction, and the third direction intersects with the first direction and the second direction.

7. The anti-loosening device according to claim 6, wherein the opening has a strip shape extending in the first direction, and a maximum distance by which the protruding structure is capable of moving in the opening along the first direction is greater than a maximum size of the second clamping part in the first direction.

8. A plunger pump, comprising: a hydraulic end, a fastener rotatable in a locking direction to be installed on a side of the hydraulic end, and a first stay rod and a second stay rod which are fixedly connected to the side of the hydraulic end, wherein the fastener comprises a plurality of positioning holes, the plunger pump further comprises the anti-loosening device according to claim 3, the first clamping part of the anti-loosening device is abutted against the first stay rod so that at least a part of the first stay rod is located in the first accommodating space, the second clamping part of the anti-loosening device is abutted against the second stay rod so that at least a part of the second stay rod is located in the second accommodating space, an end of the limiting part opposite to the first connecting part is inserted into any one of the plurality of positioning holes of the fastener along the second direction, and the elastic structure is in an elastic deformation state.

9. The plunger pump according to claim 8, wherein the first stay rod is located upstream of the second stay rod in the locking direction.

10. A plunger pump, comprising: a hydraulic end, a fastener rotatable in a locking direction to be installed on a side of the hydraulic end, and a first stay rod and a second stay rod which are fixedly connected to the side of the hydraulic end, wherein the fastener comprises a plurality of positioning holes, the plunger pump further comprises the anti-loosening device according to claim 2, the first clamping part of the anti-loosening device is abutted against the first stay rod so that at least a part of the first stay rod is located in the first accommodating space, the second clamping part of the anti-loosening device is abutted against the second stay rod so that at least a part of the second stay rod is located in the second accommodating space, an end of the limiting part opposite to the first connecting part is inserted into any one of the plurality of positioning holes of the fastener along the second direction, and the elastic structure is in an elastic deformation state.

11. The plunger pump according to claim 10, wherein the first stay rod is located upstream of the second stay rod in the locking direction.

12. The plunger pump according to claim 10, wherein in the first direction, the limiting part of the anti-loosening device is located between the first stay rod and the second stay rod.

13. The anti-loosening device according to claim 1, wherein the ng part las a pillar shape.

14. The anti-loosening device according to claim 1, wherein a material of the first bracket and a material of the second bracket are rigid material.

15. A plunger pump, comprising: a hydraulic end, a fastener rotatable in a locking direction to be installed on a side of the hydraulic end, and a first stay rod and a second stay rod which are fixedly connected to the side of the hydraulic end, wherein the fastener comprises a plurality of positioning holes, the plunger pump further comprises the anti-loosening device according to claim 1, the first clamping part of the anti-loosening device is abutted against the first stay rod so that at least a part of the first stay rod is located in the first accommodating space, the second clamping part of the anti-loosening device is abutted against the second stay rod so that at least a part of the second stay rod is located in the second accommodating space, an end of the limiting part opposite to the first connecting part is inserted into any one of the plurality of positioning holes of the fastener along the second direction, and the elastic structure is in an elastic deformation state.

16. The plunger pump according to claim 15, wherein the first stay rod is located upstream of the second stay rod in the locking direction.

17. The plunger pump according to claim 15, wherein in the first direction, the limiting part of the anti-loosening device is located between the first stay rod and the second stay rod.

18. The plunger pump according to claim 15, further comprising a plunger movably connected to the hydraulic end, the fastener being a packing nut arranged coaxially with the plunger.

* * * * *